(12) United States Patent
Vaindiner et al.

(10) Patent No.: US 10,447,562 B2
(45) Date of Patent: Oct. 15, 2019

(54) SYSTEM AND METHOD FOR DETECTING SCREEN CONNECTIVITY MONITORING APPLICATION MALFUNCTIONS

(71) Applicant: NICE-SYSTEMS LTD, Ra'anana (IL)

(72) Inventors: Alexander Vaindiner, Or Akiva (IL); Iftach Smith, Hod Hasharon (IL); Vadim Grinevich, Bney Aish (IL)

(73) Assignee: NICE LTD., Ra'Anana (IL)

( * ) Notice: Subject to any disclaimer, the term of this patent is extended or adjusted under 35 U.S.C. 154(b) by 416 days.

(21) Appl. No.: 15/062,119

(22) Filed: Mar. 6, 2016

(65) Prior Publication Data
US 2017/0257295 A1 Sep. 7, 2017

(51) Int. Cl.
*H04L 12/26* (2006.01)
*H04L 12/24* (2006.01)
*H04L 29/08* (2006.01)

(52) U.S. Cl.
CPC .......... *H04L 43/0811* (2013.01); *H04L 41/22* (2013.01); *H04L 43/16* (2013.01); *H04L 67/125* (2013.01)

(58) Field of Classification Search
CPC ... H04L 43/0811; H04L 41/22; H04L 67/025; G06F 3/048–04897; G06F 3/1415
See application file for complete search history.

(56) References Cited

U.S. PATENT DOCUMENTS

| | | | | |
|---|---|---|---|---|
| 5,958,008 A * | 9/1999 | Pogrebisky | ............ | G06F 11/32 707/E17.116 |
| 6,249,883 B1 * | 6/2001 | Cassidy | ............... | G06F 11/008 714/42 |
| 6,473,407 B1 * | 10/2002 | Ditmer | ............... | G06F 11/0709 370/252 |
| 6,938,216 B1 * | 8/2005 | Ishisaki | ................. | G06F 3/0482 715/817 |
| 7,131,037 B1 * | 10/2006 | LeFaive | ............. | H04L 41/0631 714/46 |
| 7,559,016 B1 * | 7/2009 | Rakowski | ............... | G06F 9/452 715/229 |
| 8,280,865 B1 * | 10/2012 | Edelman | ............. | G06F 17/3089 707/608 |
| 8,447,851 B1 * | 5/2013 | Anderson | ........... | G06F 11/3006 707/600 |
| 9,098,361 B1 * | 8/2015 | Greenberg | .............. | G06F 9/541 |
| 2002/0052941 A1 * | 5/2002 | Patterson | .............. | G06F 9/5061 709/223 |
| 2002/0198984 A1 * | 12/2002 | Goldstein | ............. | G06F 11/323 709/224 |
| 2002/0198985 A1 * | 12/2002 | Fraenkel | ............. | G06F 11/3409 709/224 |
| 2003/0065986 A1 * | 4/2003 | Fraenkel | ............. | G06F 11/3006 714/47.2 |
| 2006/0045185 A1 * | 3/2006 | Kiryati | ............. | G08B 13/19602 375/240.16 |
| 2007/0174419 A1 * | 7/2007 | O'Connell | .......... | G06F 11/0709 709/217 |
| 2007/0219941 A1 * | 9/2007 | Schnurr | .............. | G06F 11/3466 |

(Continued)

*Primary Examiner* — Haoshian Shih
*Assistant Examiner* — Alvaro R Calderon, IV
(74) *Attorney, Agent, or Firm* — Soroker Agmon Nordman

(57) ABSTRACT

A system and method for detecting and monitoring screen connectivity malfunctions, and generating alerts regarding presence of connectivity malfunctions, while identifying the user interface element that caused the connectivity malfunction.

10 Claims, 10 Drawing Sheets

(56) References Cited

U.S. PATENT DOCUMENTS

| | | | |
|---|---|---|---|
| 2010/0229096 A1* | 9/2010 | Maiocco | G06F 15/173 |
| | | | 715/734 |
| 2011/0283145 A1* | 11/2011 | Nemecek | G06F 11/008 |
| | | | 714/37 |
| 2013/0174156 A1* | 7/2013 | Arcese | G06F 9/45504 |
| | | | 718/1 |
| 2013/0315382 A1* | 11/2013 | Liberman | H04M 3/08 |
| | | | 379/1.02 |
| 2014/0047413 A1* | 2/2014 | Sheive | H04L 65/403 |
| | | | 717/110 |
| 2014/0324862 A1* | 10/2014 | Bingham | G06F 17/30572 |
| | | | 707/737 |
| 2015/0341212 A1* | 11/2015 | Hsiao | H04L 41/0813 |
| | | | 715/735 |
| 2016/0103559 A1* | 4/2016 | Maheshwari | G06F 17/30548 |
| | | | 715/738 |
| 2016/0103838 A1* | 4/2016 | Sainani | G06F 3/0488 |
| | | | 707/725 |
| 2017/0123885 A1* | 5/2017 | Margalit | G06F 11/0709 |
| 2017/0132052 A1* | 5/2017 | Abramovici | G06F 9/542 |

* cited by examiner

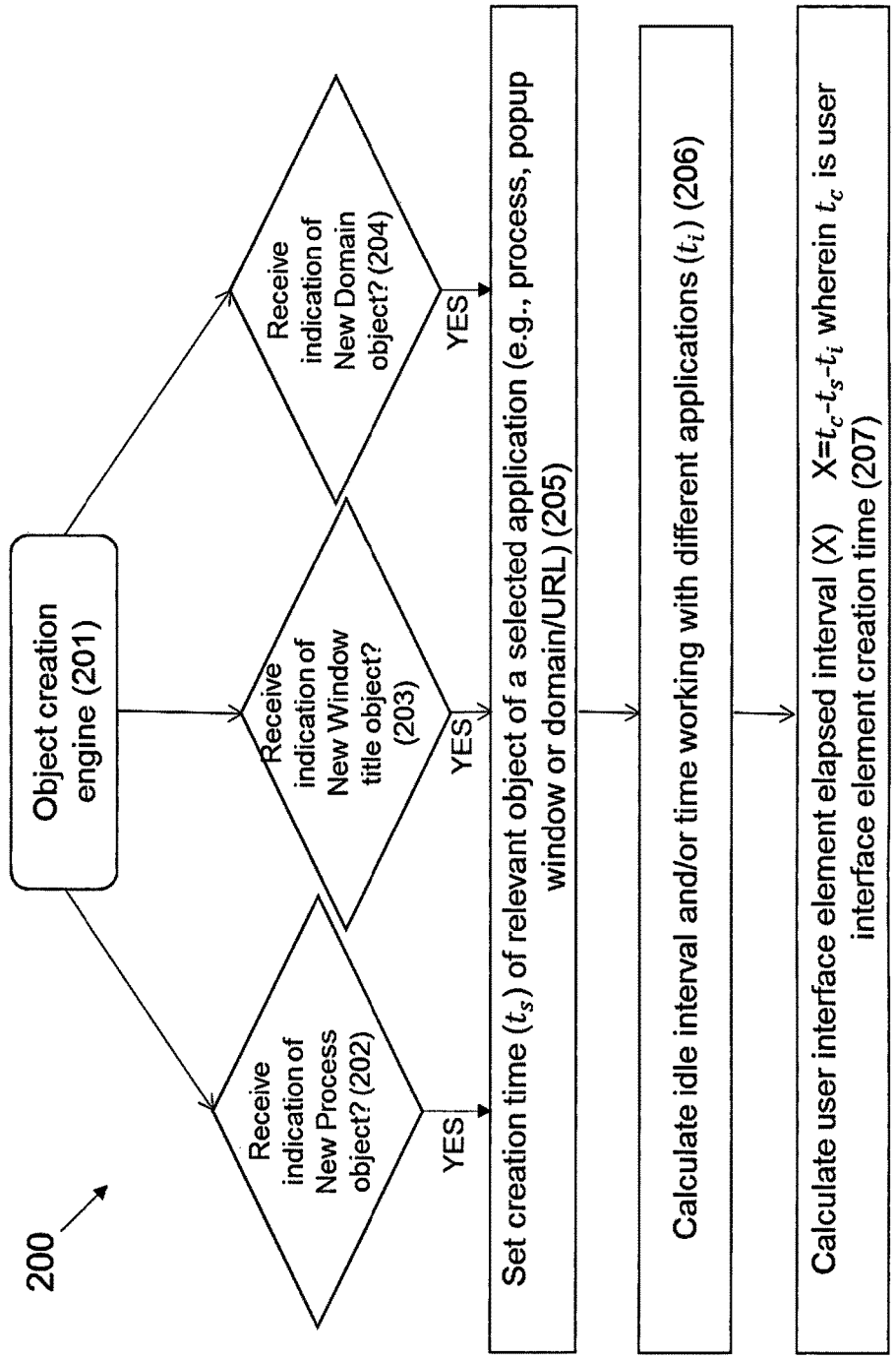

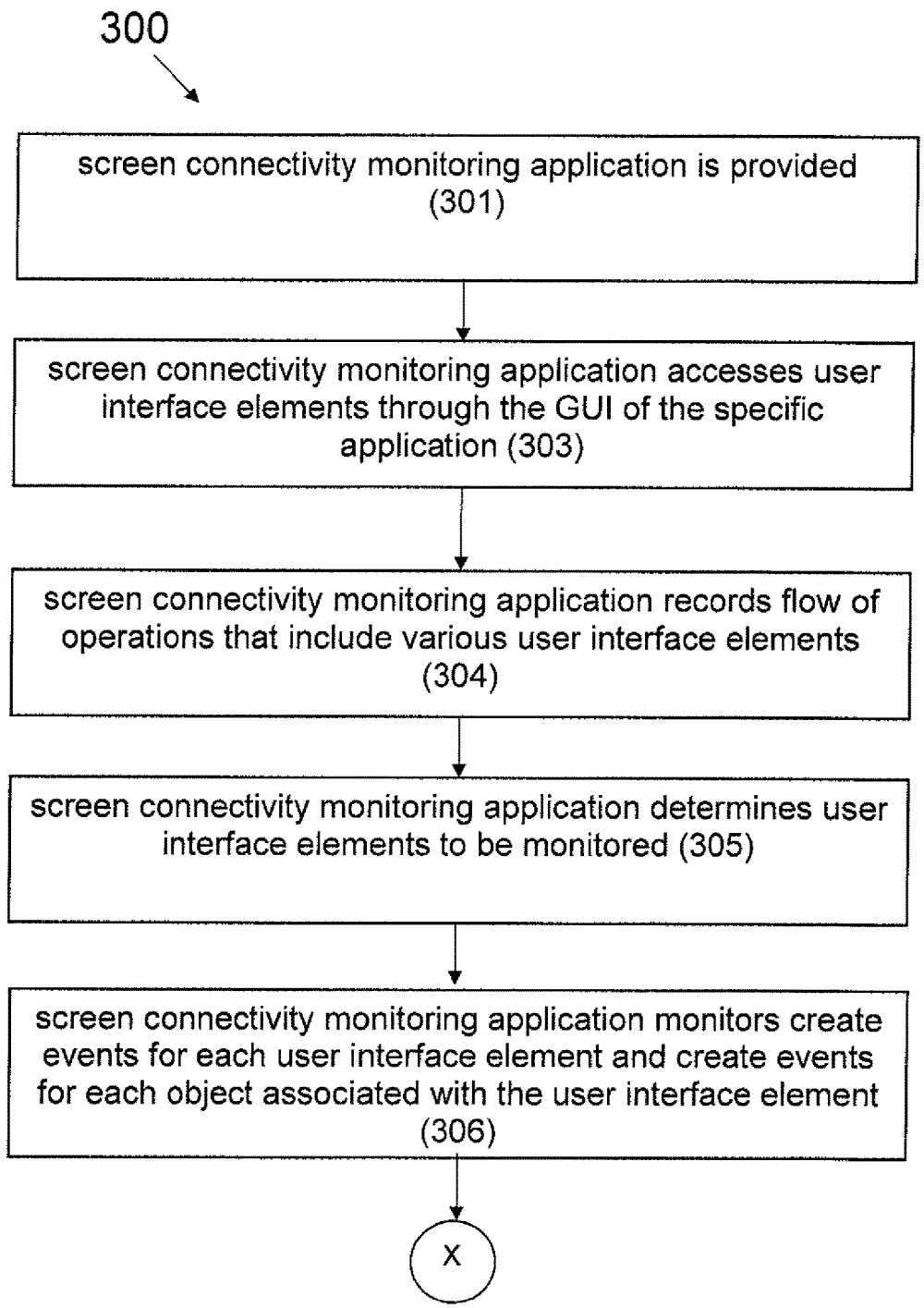

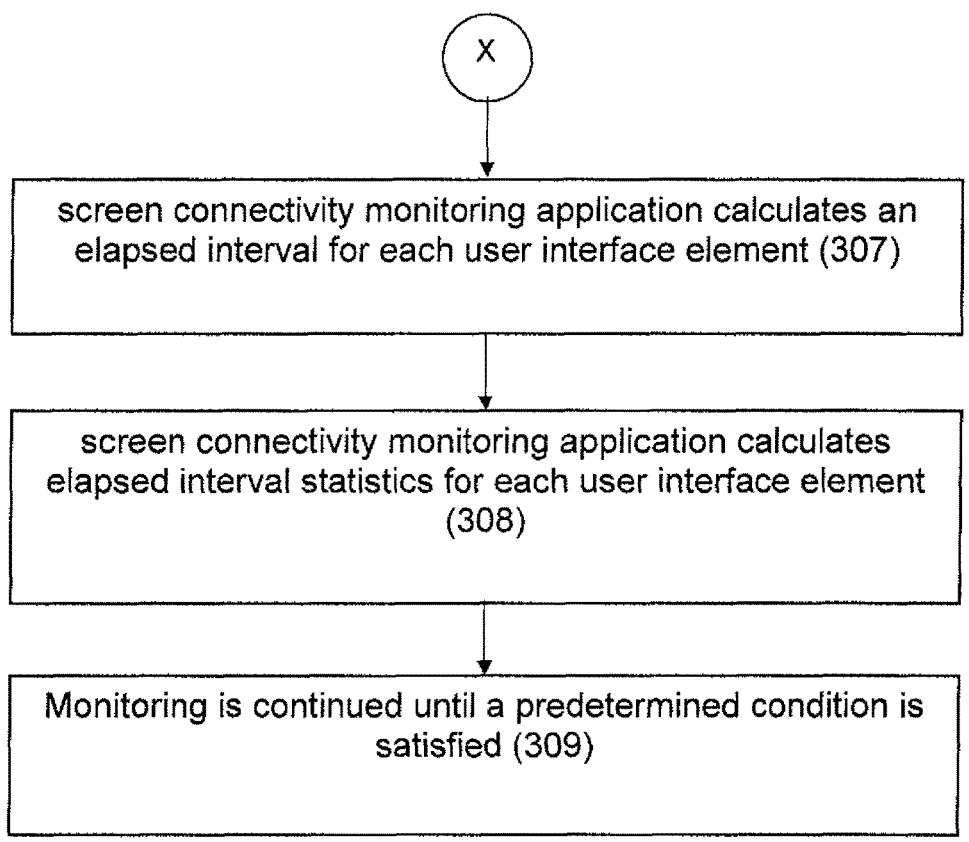
Fig. 3- continuation

US 10,447,562 B2

SYSTEM AND METHOD FOR DETECTING SCREEN CONNECTIVITY MONITORING APPLICATION MALFUNCTIONS

FIELD OF THE INVENTION

The present disclosure generally relates to on-screen operations, and more specifically to monitoring the on-screen operations.

BACKGROUND

Computers of some organizations, such as of call centers, are provided with programs or applications having graphical user interface (GUI) that personnel, such as agents, operate by or via graphical components of the user interface.

In some cases, at least possibly, the applications are upgraded or modified by additional or different functionality and/or configuration, and corresponding graphical components that may disrupt the operation of the application as originally or previously installed and operated, without the personnel or the organization being aware of these changes.

In some cases, the GUI of an application may be changed with respect to the originally or previously installed version of the application. For example, a check box, a button, a drop box, a table or any other GUI element that may have a specific user-interface functionality, may be deleted, changed or replaced with a different element or its functionality may be modified. Such a change in a GUI element may cause disruptions and/or delays in operation of another application that is linked with the GUI of the changed application.

SUMMARY

One exemplary embodiment of the disclosed subject matter is a method for automatically detecting and monitoring screen connectivity malfunctions, in real-time, in monitored applications, and automatically creating alerts, in real-time, regarding such malfunctions, by applying a two-mode algorithm comprising a learning mode, and an enforcement mode. In some cases, the enforcement mode begins when the learning mode ends, yet in other cases, the learning mode may continue during the enforcement mode, in order to continuously update parameters obtained during the learning mode, and adjust these parameters per each user.

Another exemplary embodiment of the disclosed subject matter is a system for detecting and monitoring screen connectivity malfunctions, in real-time, in monitored applications, and generating, in real-time, alerts regarding presence of connectivity malfunctions, while identifying the user interface element that caused the connectivity malfunction. The alert may be displayed to the user or to an administrator by a visual and/or auditory manner.

Another exemplary embodiment of the disclosed subject matter is a system and method for detecting connectivity malfunctions per each user of the monitored application, e.g., local connectivity malfunctions. In yet other exemplary embodiments of the disclosed subject matter, a system and method are provided for detecting and monitoring connectivity malfunctions that are systemic, and affect a plurality of users of the monitored application.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described.

Figure 1:
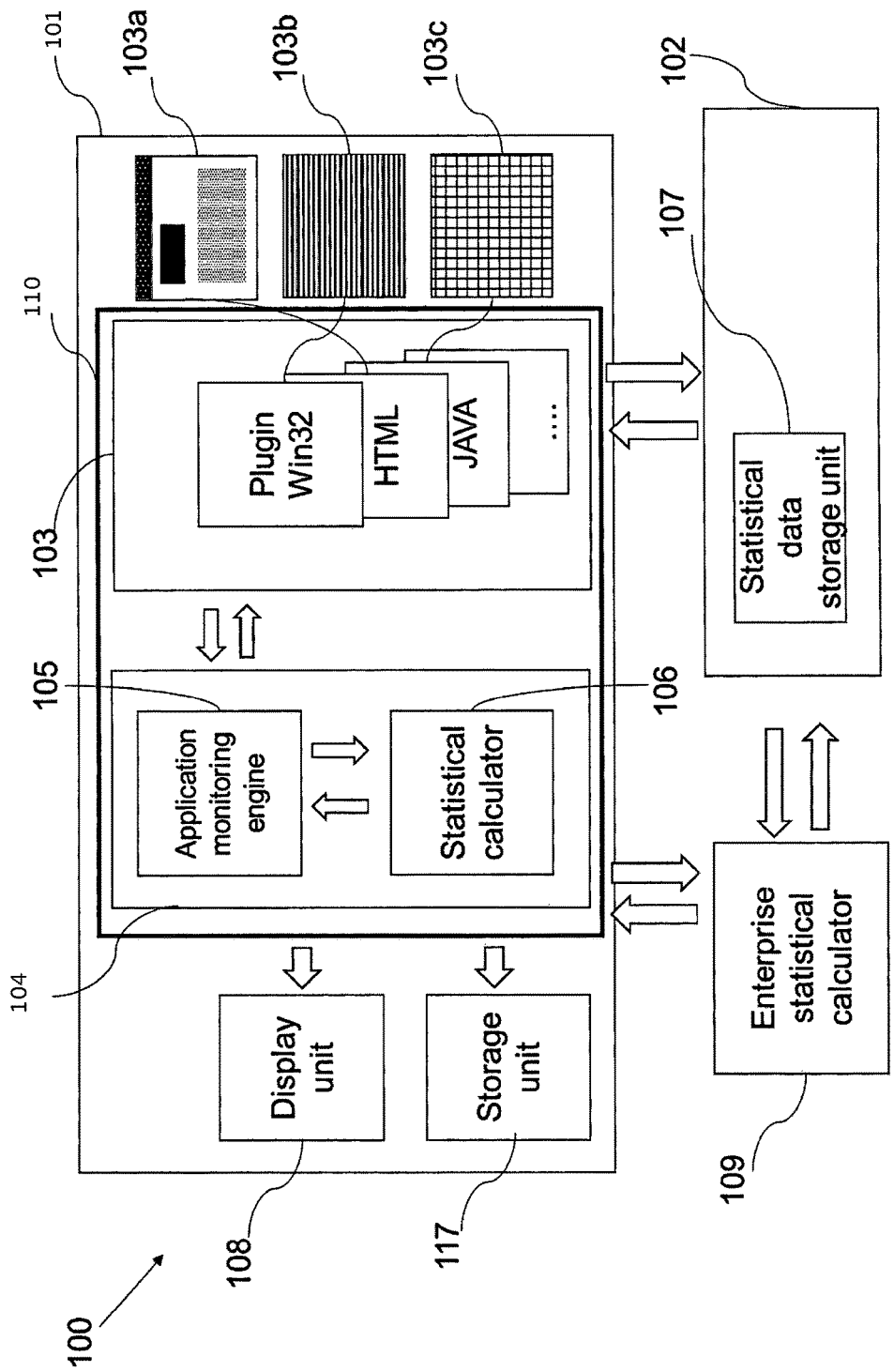

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 4:
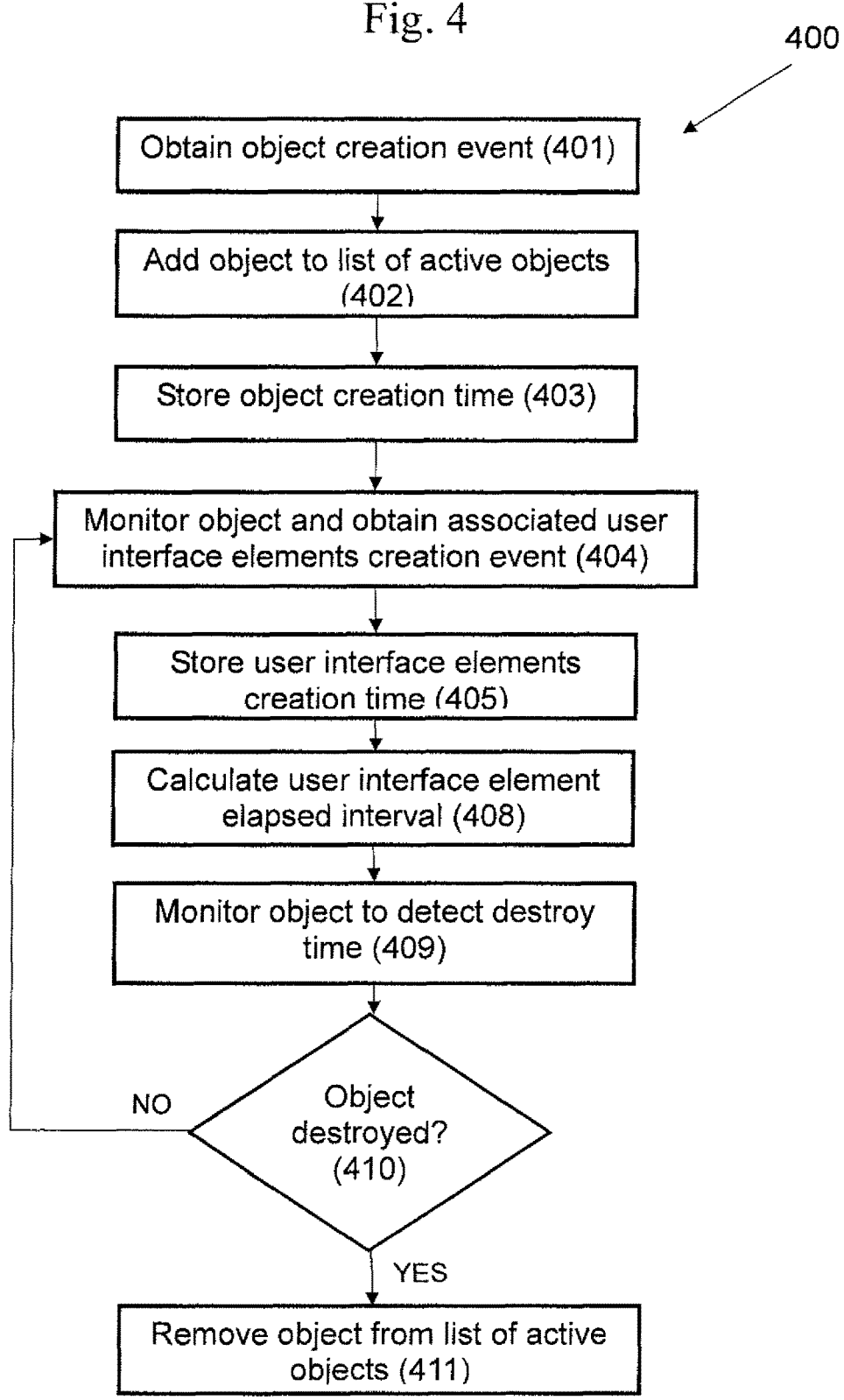
Figure 5:
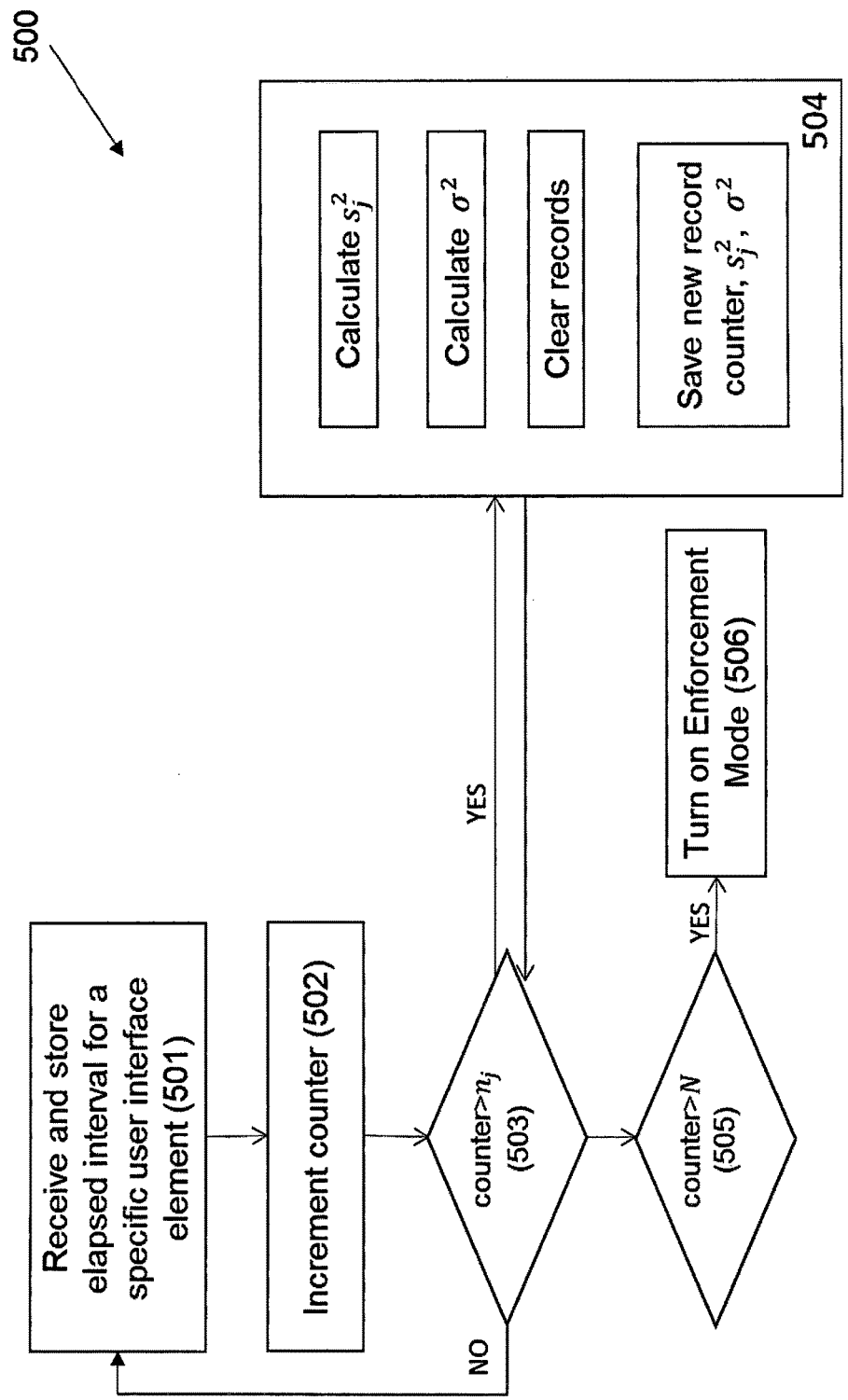
Figure 6:
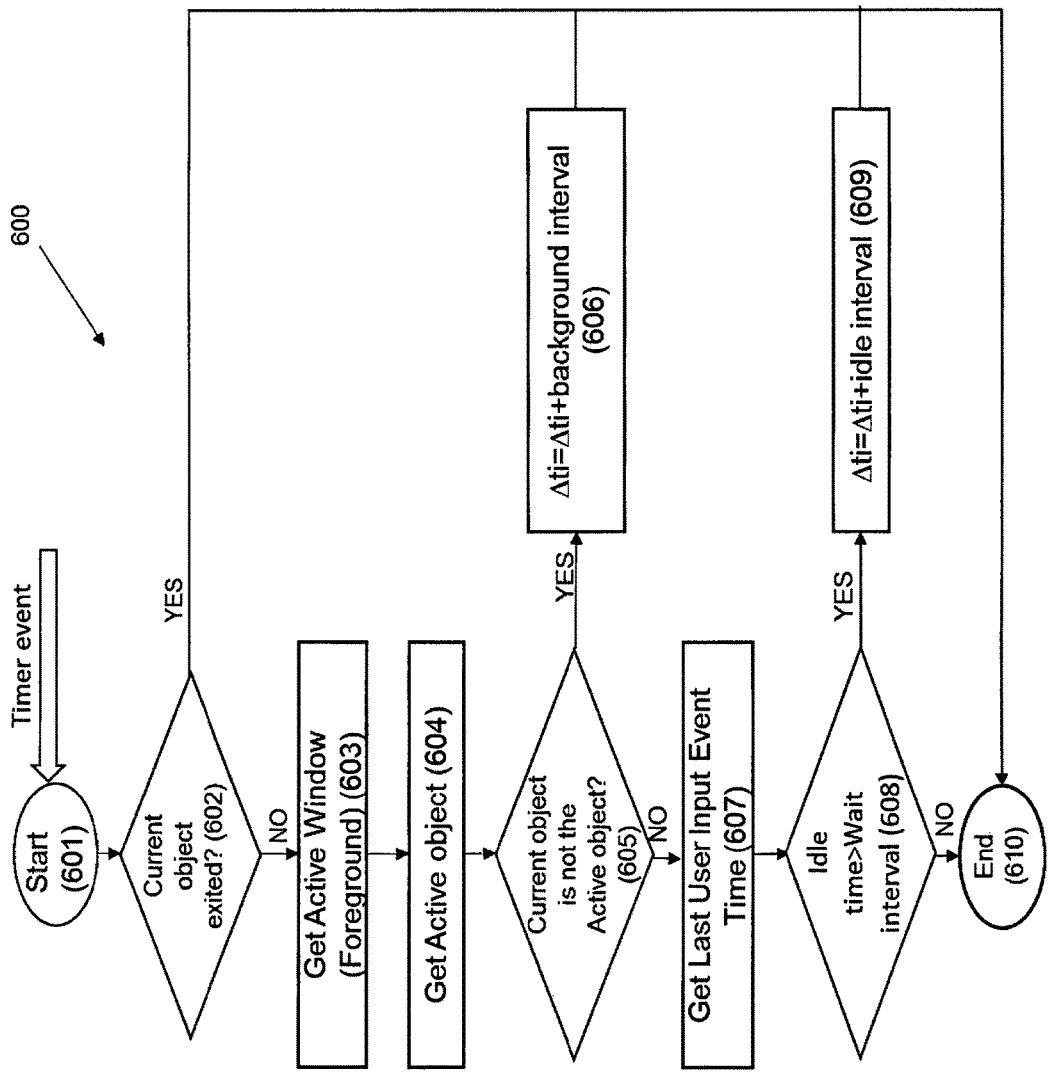
Figure 7:
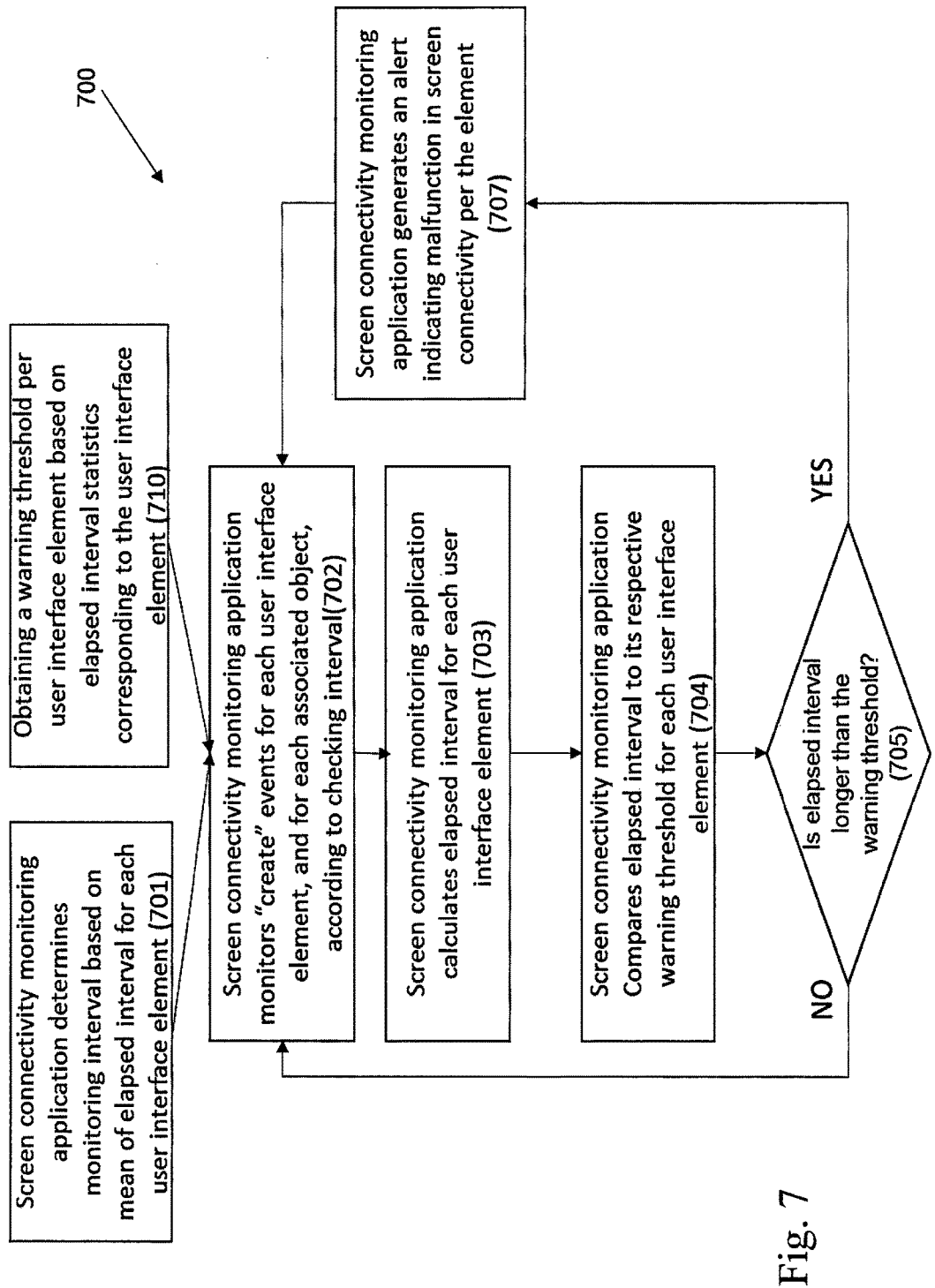
Figure 8:
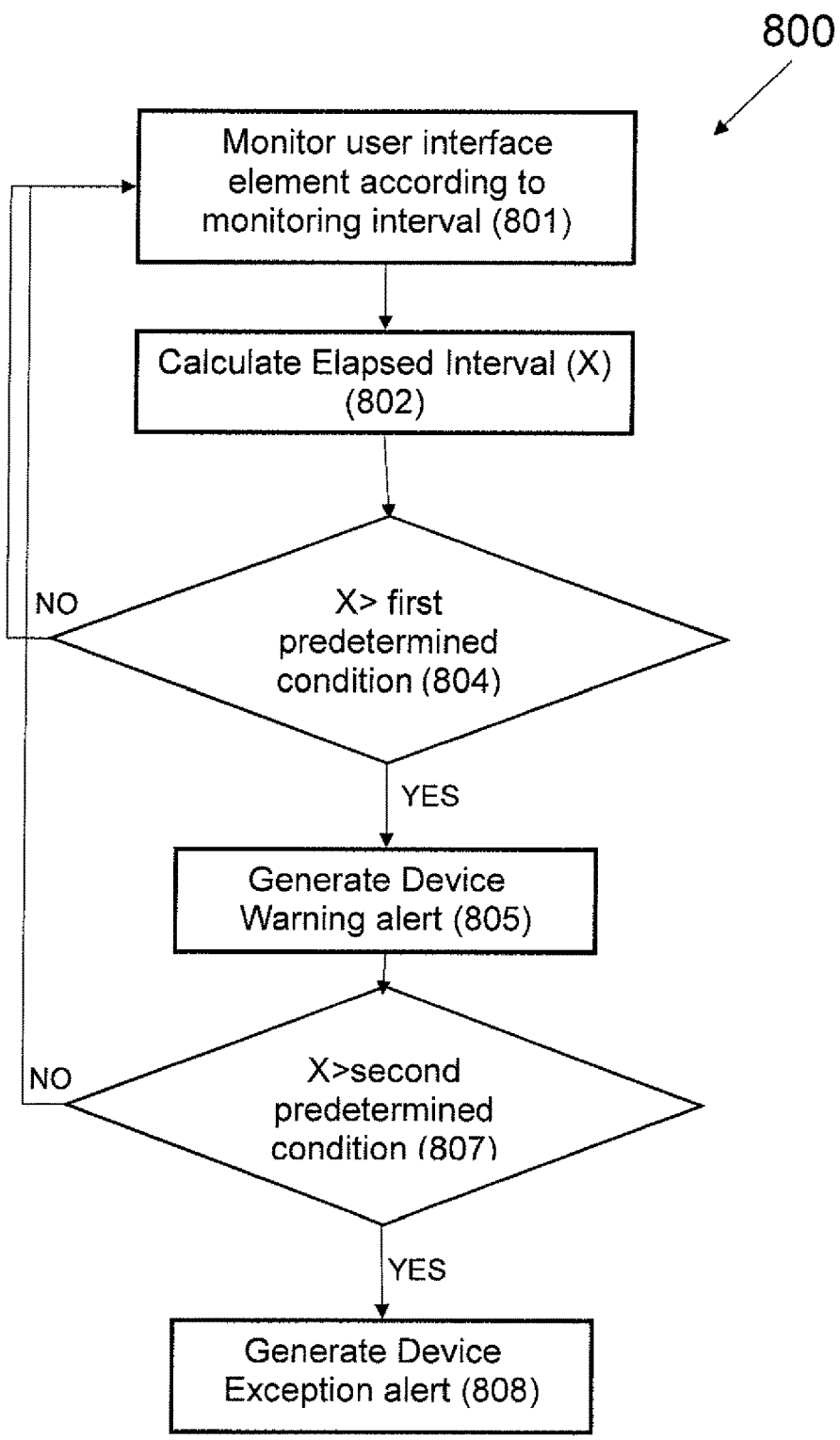
Figure 9:
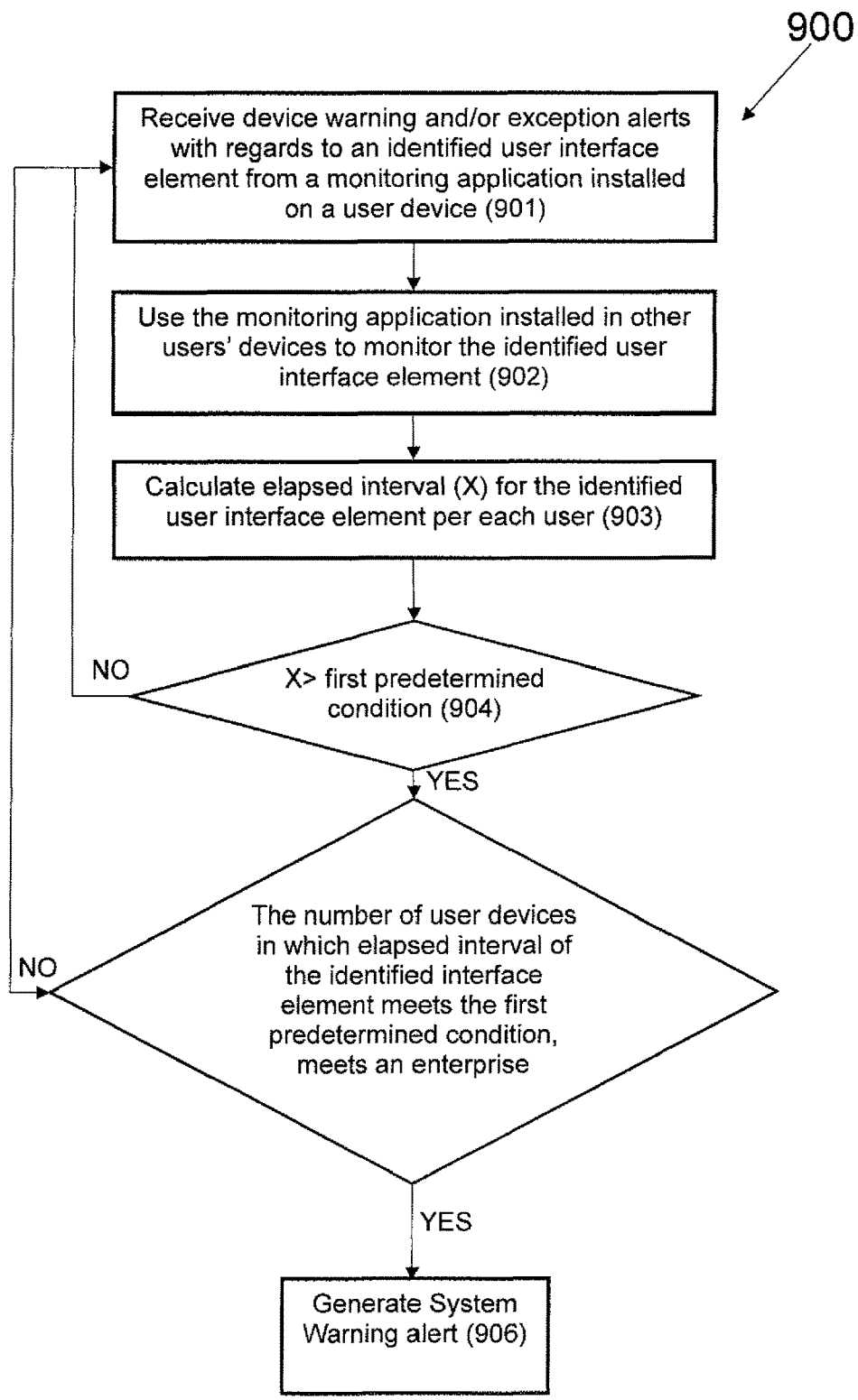

FIG. 1 schematically illustrates a system for detecting and monitoring screen connectivity malfunctions, according to exemplary embodiments of the disclosed subject matter;

FIG. 2 is a schematic flowchart of operations performed for calculating an elapsed interval value per each user interface element during the learning and/or enforcement modes, according to exemplary embodiments of the invention;

FIG. 3 is a schematic flowchart of operations performed by an application executed by a processing unit, as part of a learning mode, according to exemplary embodiments of the disclosed subject matter;

FIG. 4 is a schematic flowchart of operations performed for calculating elapsed interval per each user interface element, as part of the learning mode, according to exemplary embodiments of the invention;

FIG. 5 is a schematic flowchart of operations performed for calculating statistical parameters associated with each monitored user interface element as part of the learning mode, according to exemplary embodiments of the disclosed subject matter;

FIG. 6 is a schematic flowchart of a method for calculating inactive time intervals, e.g., idle interval of a monitored application and/or time spent by a user on other applications besides the one being monitored, according to exemplary embodiments of the disclosed subject matter;

FIG. 7 is a schematic flowchart of operations performed by a screen connectivity monitoring application, as part of an enforcement mode, according to exemplary embodiments of the disclosed subject matter;

FIG. 8 is a schematic flowchart of a method for creating device warning and exception alerts, according to exemplary embodiments of the disclosed subject matter; and FIG. 9 is a schematic flowchart of a method for creating system warning alerts, according to exemplary embodiments of the disclosed subject matter

DETAILED DESCRIPTION

In the context of some embodiments of the present disclosure, without limiting, a user interface element may be any of the following: a window, a text area, a button, a box, a drop box, a table, an html link, java control, and any other interactive element that is configured to interact with a user, e.g. receive an input, or a selection, or a command from a user. The user interface element is displayed by the GUI on a screen of a user's computerized device.

In the context of some embodiments of the present disclosure, without limiting, an object may be any of the following: a process running on a processing unit of a computerized device, a window that is displayed on a screen of a computerized device, and/or a domain or URL, which are displayed by a GUI on a screen of a user's computerized device. In the context of some embodiments of the present disclosure, an object may include at least one user interface element.

In the context of some embodiments of the present disclosure, a "create", "created" or "creation" event is a time of creation or initiation of an object, e.g. a window or process or service or a user interface element.

In the context of some embodiments of the present disclosure, a "destroy", "destroyed" or "destruction" event is a time of destruction of an object or a user interface element. Destruction of an object may include removal of the object from a task list of active tasks being executed or currently running on a computerized device. Destruction of an object may include removal of a window or a user interface element from a display of a computerized device. For example, when a window is closed, and/or when a process is completed, when an application is shut down or exited, and/or when a URL is exited, destruction of the object is recorded.

In the context of some embodiments of the present disclosure, without limiting, a baseline operation and/or functionality of or related to a graphical user interface element is defined during a baseline learning period, in an initial learning mode. The baseline functionality is determined for functionality of a sufficiently tested and/or proven and/or robust graphical user interface. For example, operation of an off the shelf commercial product or a functionality of a thoroughly tested custom program.

In the context of some embodiments of the present disclosure, without limiting, a baseline operation and/or functionality thereof may include one or more sets or flows of operations performed by a user of a monitored application, and recorded by a screen connectivity monitoring application The baseline operation is thus unique per each user and per each application, since each application comprises one or more specific sets and/or flows of operations that include specific user interface elements activated by the user in a certain order of operation. In addition, each user operates the various operation flows at different timings, e.g., a first time user would typically operate an operation flow slower than a user that has already been operating the application for some time.

In the context of the present disclosure, without limiting, a set of operations or a flow of operations implies a series of interactive user interface elements that are displayed by the GUI of the application, and which are sequentially or successively activated by a user. For example, one or more user interface elements may be associated with one another such that by activating or interacting with one element of the flow of operations, a user is led to activate a second element in the flow, and so on. The set of operations corresponds to user behavioral data which is collected by a monitoring system according to embodiments of the disclosed subject matter.

In the context of some embodiments of the present disclosure, without limiting, a faulty of malfunctioning graphical user interface is determined or established relative to a baseline operation and/or functionality thereof. A malfunction of a graphical user interface may include, for example, one or more user interface elements that are not functioning as expected compared to the baseline operation.

The terms cited above denote also inflections and conjugates thereof.

One technical problem dealt by the disclosed subject matter is detecting faults or malfunctions when operating in a graphical user interface environment.

Another technical problem dealt by the disclosed subject matter is identifying faulty components of a graphical user interface when operating in a graphical user interface environment.

In some cases, the faults or malfunctions may be subtle or non-repetitive or otherwise indistinct or unintelligible that an operator of or in the user interface could not or would not realize the malfunction and ensuing detrimental or adverse effects on the functionality and/or data of the graphical user interface environment.

In some cases or embodiments, a graphical user interface may become faulty relative to a baseline functionality thereof due to modifications in the underlying environment, or due to modification in or related to operational components thereof, or due to modified or extended interaction or interfacing of the graphical user interface with other components such as add-on or linked components, or due to other circumstances such as modified communications or data exchange within and/or between components of the graphical user interface.

One technical solution according to the disclosed subject matter is gathering behavioral data and insights of a baseline functionality of a graphical user interface of an application (e.g., related to screen connectivity functionality), and later on monitoring the GUI functionality of the application and comparing each of the user interface elements to those of the baseline functionality, thus determining which of the user interface elements has been changed. Alerts and warnings per malfunctions may be created and presented to the user. Such alerts may include information with respect to which of the user interface elements has been changed, such that the malfunction may be resolved and amended soon after detection.

Monitoring and identifying GUI functionality may include two phases, a learning phase and an enforcement phase. The learning phase includes a determining a baseline functionality of the GUI of an application, and comprises collecting user behavior data, per a specific user. The user behavior data may include, for example, times of creation and times of exit or destruction of a user interface element. Determining a baseline functionality of the GUI may further comprise calculating time related data, e.g., an elapsed interval, per each user interface element, which corresponds to the time interval spent by a user while interacting with or activating a user interface element between its creation time and creation time of its associated object.

Determining a baseline functionality may further include calculation of a statistical function based on the elapsed interval values, e.g., average, mean and/or variance of each elapsed interval per each user interface element.

During an enforcement phase, monitoring of a specific application comprises calculating and storing an elapsed interval for each user interface element for which a baseline functionality has been determined. Comparison between the elapsed interval to the mean elapsed interval and to the variance of elapsed interval corresponding to the same user interface element, both of which were calculated during the learning phase or baseline functionality mode, provides information of which user interface element has been changed with respect to the baseline functionality. Thus, a warning or alert related to the user interface element that was identified as liable to cause malfunction, may be generated and displayed to the user or an administrator.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

Reference is now made to FIG. 1, which schematically illustrates a system for detecting and monitoring screen connectivity malfunctions, according to exemplary embodiments of the disclosed subject matter. System 100 may connect to or access elements of the GUI of various applications running on a computerized device computerized device, and may monitor, in real-time, associated user interface elements that are displayed on the display unit of the computerized device. If a user interface element is changed, e.g., by a third-party application developer, by a system administrator or by a user as a result of a configuration change in the monitored application a malfunction in user interface/screen connectivity may occur. According to the present invention, system 100 may monitor in real-time, in a two-mode configuration including a learning mode and an enforcement mode, a plurality of user interface elements that are associated with a specific monitored application running on a computerized device, and determine which of the user interface elements caused a connectivity malfunction. System 100 may generate, in real-time, an alert to the user notifying the user of a detected connectivity malfunction, while identifying the user interface element that caused such malfunction.

According to some embodiments, system 100 may comprise a computerized device computerized device 101, and a connectivity server 102, to which data from computerized device 101 may be transferred, and where transferred data may be stored. In some embodiments, data may be stored in a memory and storage unit included in computerized device 101. For example, connectivity server 102 may be or may include a computer program or an executable set of software instructions configured to receive monitoring data collected and/or calculated by a screen connectivity monitoring application.

In some embodiments, computerized device 101 may comprise a screen connectivity monitoring application 110. Screen connectivity monitoring application 110 may comprise two modules. The first module is a connectivity application interface 103 that establishes and maintains communication between GUI elements of a computerized device monitored application to one or more processes running on the computerized device, e.g., application 103a may be connected to an HTML monitoring interface, application 103b may be connected to a Win32 plugin monitoring interface, while application 103c may be connected to a JAVA monitoring interface, and so on.

The connectivity application interface 103 includes a connection from the monitoring application to the Operating System level, for example to MSDN WM_CREATE message for a Windows Plug-in, which is a message sent by the Windows Operating System when an application requests that a window be created by calling the CreateWindowEx or CreateWindow functions. The window procedure of the new window receives this message after the window is created, but before the window becomes visible. Similarly, WM_DESTROY message for a Windows Plug-in is a message sent by the Windows Operating System when a window is being destroyed. It is sent to the window procedure of the window being destroyed after the window is removed from the screen. This message is sent first to the window being destroyed and then to the child windows (if any) as they are destroyed.

Connectivity application interface 103 determines which screen elements it should monitor based on the input flows. Connectivity application interface 103 may inject hooks to the target applications, e.g., to applications 103a-103c, and may monitor all the new windows that are being created on the Operating System level (e.g., by monitoring WM_CREATE messages). Connectivity application interface 103 may then use an input metadata on each screen element in order to analyze if a Create event should be raised/recorded. Once a screen element was created, connectivity application interface 103 may monitor it (e.g., by monitoring WM_DESTROY messages) until a destroy message on the Operating System level is sent to this window, which will then raise or record a Destroy event.

The second module of screen connectivity monitoring application 110 is a connectivity watcher 104, which may be or may include executable operations configured to be executed by a processing unit. According to some embodiments, connectivity watcher 104 may be a stand-alone application, and need not be a module within connectivity monitoring application 110. Connectivity watcher 104 may be a software and/or hardware module configured to monitor and detect screen connectivity malfunctions in any monitored application running on computerized device 101, by monitoring user interface elements associated with a specific monitored application running on computerized device 101.

In some embodiments, connectivity watcher 104 may comprise an application monitoring engine 105, configured to monitor the application running on the computerized device 101, e.g., running on the desktop of the computerized device. In some embodiments, application monitoring engine 105 may monitor creation and destruction events of objects and/or user interface elements associated with a specific monitored application. According to the creation (and destruction) events recorded per each user interface element, application monitoring engine 105 may calculate an elapsed interval, which defines the active time interval of a specific user interface element, with respect to its associated object. Application monitoring engine 105 may be implemented on a processing unit, e.g. a processing unit of the computerized device 101, and/or a remote processing unit which may be operationally connected to the computerized device 101.

In some embodiments, connectivity watcher 104 may further comprise statistical calculator 106, which may also be implemented on a processing unit, and which is configured to perform statistical processing of the time related data that is collected with respect to the monitored application (e.g., the creation and/or destruction events' timing or timestamp). The statistical data, which is calculated by statistical calculator 106, may be stored either on computerized device 101 in an internal memory or storage unit 117 or in connectivity server 102 under statistical data storage unit 107. Statistical data calculated by statistical calculator 106 may comprise, for example, a statistical mean, average, and/or standard deviation/variance of the elapsed intervals recorded per each user interface element.

In some embodiments, connectivity watcher 104 may monitor a plurality of user interface elements. Each user interface element represents a single interactive element which is visible on a GUI of the monitored application (e.g., a window, a text area, a button, a URL or hyperlink, a java control button, etc.) with which connectivity application interface 103 interacts. For each element, connectivity monitoring application 110 stores a set or a list of identification parameters that are unique to a specific object. An object may be a process, a window, or a domain/URL. Each object may include at least one user interface element. An identification parameter may include or represent a process name, a window caption, a URL value, a size, a position, one or more styles associated with the displayed element, a parent and other attributes of an object. Since each element is associated with its own unique identification parameters, locating the required object is enabled.

Connectivity watcher 104 may collect and analyze the statistical data, e.g., calculates statistical parameters related to the elapsed interval that is calculated during a learning mode between the 'Created' event for each monitored user interface element, and the 'Created' event for each associated object. In another example, the elapsed interval may be calculated as the time between a 'Destroyed' event of a user interface element and an associated 'Created' event of the same user interface element. This may be done in order to determine a baseline functionality, which includes a calculated statistical value (e.g., mean, average, etc.) of exemplary or typical elapsed intervals per each user interface element. Connectivity watcher 104 further obtains a warning threshold per user interface element, which is based on collected elapsed interval statistics corresponding to the user interface element. In order to determine whether a user interface element is suspicious or liable to cause a malfunction of the monitored application, Connectivity watcher 104 compares elapsed intervals (calculated during an enforcement mode) per each user interface element, in order to recognize abnormal functionality and screen connectivity malfunction. The statistical data may be stored either on computerized device computerized device 101 or in connectivity server 102, e.g. in a statistical data storage unit 107.

According to some embodiments, connectivity watcher 104 operates in two modes: learning mode and enforcement mode, as will be described in detail in FIGS. 3 and 7, respectively. During the learning mode, connectivity watcher 104 may determine, for each monitored application, the user interface elements to be monitored. Connectivity watcher 104 may monitor the determined user interface elements for presence of creation (and destruction) events, and may calculate elapsed interval values for each user interface element. The abovementioned determinations, monitoring, and calculations may be performed by application monitoring engine 105.

During the learning mode, connectivity watcher 104 may calculate statistical parameters for each user interface element by using statistical calculator 106. After a predetermined condition is satisfied (e.g. the number of collected active values reaches a certain amount, or a predetermined time period elapses), the enforcement mode may be activated. During the learning mode and/or during the enforcement mode, connectivity watcher 104 may determine a monitoring interval to sample creation and destruction events associated with each user interface element. That is, the monitoring interval may be an interval of time during which or after which parameters of each user interface element are sampled or repetitively monitored.

Connectivity watcher 104 may monitor the selected user interface elements, to obtain time of creation and/or destruction events, and may calculate an elapsed interval for each user interface element via application monitoring engine 105. Connectivity watcher 104 may further compare the elapsed interval to a warning threshold. In some embodiments, the warning threshold may be calculated based on the statistical parameters calculated during the learning mode.

Connectivity watcher 104 may generate, in real time, an alert to the user regarding the presence of user interface/ screen connectivity malfunctions. In some embodiments, the alert may comprise an identification of the user interface element that caused the connectivity malfunction. In some embodiments, system 100 may further comprise a display unit 108 configured to provide the alert to the user in an auditory or visual manner, e.g., via a pop-up window, with or without sound, with or without flashing or flickering of the alert, and so on.

According to some embodiments, system 100 may further comprise an enterprise statistical calculator 109, configured to perform statistical calculations, in real-time, on data recorded and stored from substantially all users of the monitored application. Thus, enterprise statistical calculator 109 may receive data from storage unit 107 and perform statistical manipulations on time related data collected from substantially all users, per each and every user interface element. This may enable determination on whether or not a connectivity malfunction is a local malfunction that occurred on one user's computerized device, or whether the connectivity malfunction is a systemic malfunction that may affect other or all users. Thus, elapsed interval per each user interface element may be compared to predetermined conditions, e.g., to warning and exception thresholds, which may be obtained based on time related data collected from substantially all users of the application being monitored. A respective alert may then be generated and displayed to other or all users or to an administrator, if the malfunction is systemic, or to the relevant user, if the malfunction was found to be local per a specific user. In other embodiments, if a warning alert and/or exception alert were generated by screen connectivity monitoring application for one user, the user interface element that was found liable to cause generation of the alert (and which may be identified by the alert) may be examined for each user, in order to determine whether or not the malfunction caused by the specific user interface element was local or systemic.

According to some embodiments, storage unit 107, may be configured to store statistical data per user, and/or statistical data per other or all users of a monitored application.

Reference is now made to FIG. 2, which is a schematic flowchart of operations 200 performed by the application of the invention for calculating elapsed time, during the learning and/or enforcement modes, according to exemplary embodiments of the disclosed subject matter. According to FIG. 2, objects, such as processes, windows and domains are first created, and creation of their associated user interface elements follows thereafter. Processes, windows and domains may be created by an object creation engine in operation 201. Whether it being a new process as in operation 202, a new window title as in operation 203, or a new domain as in operation 204, once any of the above is created, i.e., once any of a process, a window title or domain appear on the computerized device's GUI, and a creation event is recorded, an associated time of creation is set and recorded.

In operation 205, creation time ($t_s$) is set as creation time of an object, e.g., a relevant process, window or domain. In operation 206, idle interval and/or time spent on applications other than the one being monitored, are calculated. In some embodiments, idle interval represents the time period during which the user performs no action, and although the monitored application is in the foreground, no activity is recorded. Idle interval may also be referred to as relax or rest time. Idle interval, and/or time spent on applications other than the monitored one, may be calculated as described with respect to FIG. 6.

In operation 207, the elapsed interval or time spent by the user, per a specific user interface element may be calculated based on creation time of a user interface element, and on the creation time of an object associated with the user interface element (e.g., an object containing the user interface element. The time at which a user interface element was created, e.g., the time at which the user interface element appeared on the GUI of the computerized device, may be recorded. The elapsed interval may then be calculated by subtracting from the specific user interface element's creation time, the idle interval and/or time spent on applications other than the monitored application, and by further decreasing the creation time of an object associated with the user interface element.

Reference is now made to FIG. 3, which is a schematic flowchart of operations performed by an application executed by a processing unit, as part of a learning mode, according to exemplary embodiments of the disclosed subject matter. After performing the operations of learning mode flow 300, a baseline functionality set of values may be generated and used to define a time-related parameter measured for each user interface element, e.g. an average time of operation for each user interface element, the standard deviation, and/or other statistical parameters.

During learning mode, the application provided by the present invention (e.g. screen connectivity monitoring application 110), "learns" the user's behavior, e.g. typical time a user spent interacting with and/or activating each of the user interface elements of a specific application running on the user's computerized device, by recording a plurality of time-related data values for each user interface element, and calculating statistical functions using the recorded time-related data. For example, per each user interface element, a typical or mean time spent, activated, interacted with or operated by a user, may be recorded and saved on the computerized device or on another storage unit, and new time related data indicating time the user interacted with or spent on each user interface element that will be collected during the enforcement mode, will later be compared to the time related data collected and calculated during the learning mode.

The learning mode flow 300 comprises several operations. In operation 301, a screen connectivity monitoring application is provided according to embodiments of the present invention, e.g. screen connectivity monitoring application 110 of FIG. 1 In some embodiments, the screen connectivity monitoring application, may be installed on a user's computerized device, e.g., by a user, or by a system administrator, or by an automatic installation module. After screen connectivity monitoring application is installed on a user's computer, screen connectivity is enabled, e.g., screen connectivity monitoring application may be able to connect to, monitor and/or track any user interface element displayed on the GUI layer of the user's computerized device, through 'connectivity application interface', as 'connectivity application interface' 103, which is described with respect to FIG. 1.

A user may initiate a specific application that runs on the user's computerized device and is to be monitored by the screen connectivity monitoring application, or the screen connectivity monitoring application may perform automatic initiation of the specific application, such that in operation 303 screen connectivity monitoring application may access or connect to or receive data from user interface elements through the GUI of the monitored application and collect data which is associated with that specific application, by collecting time-related data on the corresponding or associated user interface elements.

In operation 304, screen connectivity monitoring application may record a flow of operations that include interaction of the user with various user interface elements. The flow of operations may include user interface elements that are related to or associated with one another, such that selecting one leads the user to select another one or more elements in that same flow, and so on. In this operation, screen connectivity monitoring application may record or collect data related to the user interface elements that are activated during one or more sessions (or periods of time) in which the user interacts with the monitored application.

Accordingly, in operation 305, screen connectivity monitoring application may determine which user interface elements should be monitored by it. That is, by recording the data related to the user interface elements that are activated during one or more sessions or that appear in operational flows associated with an application being monitored by screen connectivity monitoring application, screen connectivity monitoring application in fact generates a list of user interface elements that are to be monitored for possible user interface/screen connectivity malfunctions. In some embodiments, all user interface elements which were interacted with or activated by the user during the recording of operation 304 may be determined as elements to be monitored.

In operation 306, screen connectivity monitoring application monitors a predetermined set of events associated with user interface elements that are being monitored. For example, "create" events for each user interface element, "create" events for each object associated with the user interface element, and "destroy" or "exit" events for each user interface element that was determined to be monitored in operation 305 may be received and recorded, e.g. in storage unit 117 and/or 107.

Screen connectivity monitoring application may perform such monitoring through module connectivity watcher 104, as described with respect to FIG. 1. A "create" event is recorded or registered by screen connectivity monitoring application when a user interface element is created in the user interface windows, URLs or processes of a monitored application, e.g., when the user interface element appears on a display unit of the computerized device. A "destroy" event is recorded or registered by screen connectivity monitoring application when the element no longer appears or exists on the computerized device, e.g. when a window is closed, and/or when a process is completed, and/or when a URL is exited. It is noted that a destroy event is not determined or indicated when a process is idle or inactive, but rather when a process is shut down or has been exited. Similarly, a window of a monitored application which is displayed in the background and is not in the foreground or not currently active, still exists on the computerized device (e.g., still available in a current task list of the computerized device) and thus is not determined as 'destroyed'.

In operation 307, screen connectivity monitoring application calculates the elapsed interval for each user interface element, as explained in detail with respect to FIG. 2. The elapsed interval is a time interval between occurrence of a "create" event (e.g., create event timestamp) of a specific user interface element and occurrence of a "create" event of an associated object. In another example, the elapsed interval may be calculated as the time between a 'Destroyed' event of a user interface element and an associated 'Created' event of the same user interface element.

An elapsed interval value is calculated per each user interface element and per each user, in each session of an application being monitored by the screen connectivity monitoring application. Since the times of creation (and destruction) of user interface elements and their associated objects varies from one user interface element to another, and varies between users and between sessions of a monitored application.

In operation 308, screen connectivity monitoring application may calculate a time-related statistical parameter, e.g., the mean/average (μ), and/or the standard deviation (σ) of the elapsed interval for each user interface element, as well as any other statistical parameter. These statistical parameters will be used during enforcement mode to determine the monitoring interval for repetitively sampling and monitoring creation events associated with each user interface element and respective object during an enforcement mode. In addition, the statistical parameters are used during the enforcement mode for determining one or more warning and exception thresholds. The warning and exception threshold are compared to time intervals calculated per each user interface element during the enforcement mode, in order to determine presence of connectivity malfunctions.

In operation 309, screen connectivity monitoring application may continue to monitor the user interface elements of a specific application until a predetermined condition is satisfied, for example, until the number of observations collected by screen connectivity monitoring application is statistically valid, e.g., 90 observations or 120 observations. Observations may be grouped into samples, each sample size may be, for example, 30 observations.

Reference is now made to FIG. 4, which is a schematic flowchart of operations 400 performed for calculating elapsed interval per each user interface element, as part of the learning mode, according to exemplary embodiments of the invention. An elapsed interval value is calculated per each user interface element, for each monitored session during a learning mode of a monitored application. The elapsed interval value is the amount of time spent by a user interacting with or activating an object associated with a user interface element, between a creation event occurrence of an object and a creation event occurrence associated with the specific user interface element associated with the object.

According to some embodiments, an executable application running on a computerized device comprises one or more objects. Each object may be or may include one or more processes, windows, or a domain/URLs. Every object may include at least one user interface element. Therefore, creation time of an object should be decreased from creation time of a user interface element (while further decreasing idle time and time spent on other applications, as will be explained in detail with respect to FIG. 6), in order to determine the elapsed interval per a user interface element.

In some embodiments, an elapsed interval value of a certain user interface element during a certain session may be calculated according to the flow of operations illustrated in FIG. 4. In operation 401, an object creation event is obtained by screen connectivity monitoring application. The object creation event includes an object identifier and an object creation timestamp, the timestamp indicates the time and date of the event.

In operation 402, the object is added to a list of active objects, which is a list that includes all active objects per a specific application being monitored by screen connectivity monitoring application. Active objects may include objects that are running in the background of a computerized device, and/or objects that are idle or not currently interacted with by a user, as well as objects that are running in the foreground and being interacted with by the user.

In operation 403, the object creation time may be stored, either on the computerized device or on a server. The object creation time list may be stored per user interface element, for example, in storage unit 117 and/or 107.

In operation 404, the object is monitored in order to obtain its associated user interface elements' creation events and timestamps. Parameters associated with the creation event, e.g., its time of occurrence per each user interface, may be stored, either on the computerized device or on a server, according to operation 405. Screen connectivity monitoring application may calculate the user interface element elapsed interval, according to operation 408, e.g. by: $X = t_c - t_s - t_i$, wherein:

X is the elapsed interval;

$t_c$ is the creation time of the user interface element;

$t_s$ is the creation time of the object, which includes the user interface element; and $t_i$ is the idle time or time spent on applications other than the monitored application.

According to some embodiments, screen connectivity monitoring application continues to monitor the object, in order to detect destroy event of the object, as indicated by operation 409. In operation 410, determination regarding destruction event of the object is performed. If the object is determined to be destroyed, then in operation 411, the object is removed from the list of active objects, and other objects, as well as their associated user interface elements may then be monitored by screen connectivity monitoring application. However, if a destroy event was not recorded per the object, in operation 410, then the object continues to be monitored to obtain associated user interface element creation event, as in operation 404, and thus to calculate elapsed interval values for other user interface elements.

Reference is now made to FIG. 5, which is a schematic flowchart of operations 500 performed for calculating statistical parameters associated with each monitored user interface element as part of the learning mode, according to exemplary embodiments of the disclosed subject matter. Statistical processing of the calculated elapsed interval values for each user interface element, is typically performed during the learning mode by a statistical calculator, which is included in screen connectivity monitoring application (e.g., statistical calculator 106 in FIG. 1), in order to create a baseline database of the statistical elapsed interval values, (which indicate an amount of time that a user interacted with, or actively spent, per each user interface element. The baseline data is used to determine statistical time-related values associated with each user interface element during the learning mode, and accordingly, to determine any abnormal or uncharacteristic time-related values associated with each user interface element during the enforcement mode.

However, according to some embodiments, in order to improve the speed of calculations, and in order to reduce the memory required for statistical calculations of the entire population (N) of elapsed interval values that are sampled for each monitored user interface element, the statistical calculations may be done in portions or phases. Each portion, comprises a predetermined number of elapsed interval values or observations per element, wherein each value is obtained during a single session of a user of the monitored application. For example, a portion may comprise 'n' elapsed interval values, e.g. 30 or 60 values in some embodiments, though other numbers of observations may be implemented. When the number of accumulated observations in a portion reaches 'n' observations, then the observations are processed and statistical manipulations are performed. Observations in each portion are summed, and pooled mean and pooled variance are calculated, e.g. using known statistical formulas. When the last portion has accumulated 'n' observations, the population mean and population variance are calculated.

The statistical processing may include calculating known formulas, for example as follows:

(i) Population mean μ is defined as:

$$\mu = \frac{1}{N}\sum_{i=1}^{N} x_i$$

wherein 'N' is the population size, e.g. the population of elapsed interval values per interface element;
'i' is the observation serial index;
'$x_i$' is the elapsed interval time value of the observation number T.

(ii) Population variance σ is defined as:

$$\sigma^2 = \frac{1}{N}\sum_{i=1}^{N}(x_i - \mu)^2$$

(iii) portion mean $\mu_j$ is defined as:

$$\mu_j = \frac{1}{n_j}\sum_{i=1}^{n_j} x_i$$

wherein 'j' is the portion serial index; and
'$n_j$' is the portion size.

(iv) portion variance is defined $s_j$ as:

$$s_j^2 = \frac{1}{n_j}\sum_{i=1}^{n_j}(x_i - \mu_j)^2$$

(v) The pooled (combine) mean $\tilde{\sigma}$ is defined as:

$$\tilde{\sigma}^2 = \frac{\sum_{j=1}^{k} s_j^2 n_j}{\sum n_j}$$

wherein 'k' is the number of portions; and
'j' is the serial index of observation portion.

(vi) Pooled mean $\bar{\mu}$ is defined as:

$$\bar{\mu} = \frac{1}{\sum n_j}\sum_{j=1}^{k}\mu_j n_j$$

(vii) Pooled variance δ is defined as:

$$\delta^2 = \frac{1}{\sum n_j}\sum_{j=1}^{k}(\mu_j - \bar{\mu})^2 n_j$$

(viii) Statistic variance (dispersion) is calculated as: $\sigma^2 = \tilde{\sigma}^2 + \delta^2$ According to some embodiments, in operation 501, an elapsed interval per a specific user interface element is received and stored by screen connectivity monitoring application. In operation 502, a counter may be incremented in order to reach the entire observations per portion According to operation 503, if the counter exceeds the no. of observations per portion ('n') then in operation 504, the various statistical calculations are performed on the recorded observations, e.g., portion variance and pooled variance are calculated, though other and additional statistical calculations may be performed in operation 504. If the counter doesn't exceed the total number of observations in the portion, then elapsed intervals are continuously received and stored, as indicated by operation 501. Once the number of observations reaches the total number of the population, e.g., when the counter meets or exceeds N observations, statistical calculations are performed, and the enforcement mode begins, according to operation 506.

Reference is now made to FIG. 6, which is a schematic flowchart of a method 600 for calculating inactive time intervals, e.g. idle time of a monitored application and/or time spent by a user on other applications besides the one being monitored, according to exemplary embodiments of the disclosed subject matter.

According to some embodiments, there may be a time when the monitored application is no longer the active application on the computerized device, e.g., that the monitored application is no longer in the foreground. This may happen when a user stops working on or operating the monitored application and turns to work on other applications. Thus, an application different than the one being monitored may intermittently become the active application running on the computerized device, instead of the monitored application. The time spent by a user working with applications other than the one currently being monitored by screen connectivity monitoring application, referred to herein as a background interval, may be calculated and considered when calculating an elapsed interval. For example, the background interval may be subtracted from the time of creation of a user interface element, in order to accurately calculate the elapsed interval.

According to some embodiments, in order to calculate time spent on applications other than the monitored application, the present invention provides a polling mechanism to detect the active window, e.g., the active application currently running on the computerized device. According to some embodiments, for each target application, an inactivity timer is initialized. An inactive interval determined by the inactivity timer may allow adjusting the elapsed interval calculated for a monitored user interface element. The screen connectivity monitoring application may determine which window is currently in the foreground. i.e., which window is currently active.

User input events are detected and their time of occurrence is stored. A user input event may be a "keyboard" event, e.g., a tap on any key of the keyboard, that is connected to the computerized device, or a "mouse" event, e.g., a click or movement of the mouse that is connected to the computerized device. An application programming interface (API) may be provided, e.g. via an operating system that controls the computerized device, which allows obtaining the time at which such user input events took place. An idle interval is measured, e.g. by determining the time of the last user input event. The inactive interval $\Delta t_i$ is the sum of the input idle times plus the time spent working with other applications for the current process.

In operation 601, an object creation event and its time of occurrence is recorded by the screen connectivity monitoring application and an inactivity timer is initiated. In operation 602, it is determined whether or not the currently monitored object has been exited, e.g., the object ended or was canceled and no longer exists. If the object has been exited, then the inactive interval time calculation is completed, as indicated by operation 610.

If the object is still running or active, then in operation 603, the active object, e.g., the foreground window or process, is detected.

In operation 604, the active object, e.g. the active window may be detected. Determination as to whether the current monitored object is different than the current active object is made in operation 605. If the current monitored object is different than the current active object, then in operation 606, the inactive interval $\Delta t_i$ is incremented to include the time spent on other applications, referred to herein as a background interval.

However, if the current monitored object is indeed the active object, e.g., in the foreground, then in operation 607, an idle interval is calculated. Idle interval is the time interval during which the object is in the foreground but no user input events were detected by the screen connectivity monitoring application. Idle interval is a time period of rest or relaxation or inactivity of the user, during which there is no interaction, activity or input detected from the user into the monitored application and/or object. During idle interval, although the process or window is in the foreground and considered active, no actual interaction is detected.

In operation 607, the last user input event and its time, e.g., an up-to-date user input event time, is recorded. In operation 608, the recorded last user input event time is compared to a wait interval, in order to determine whether or not the idle interval is longer than the 'wait interval', which is recorded by the inactivity timer. The 'wait interval' is a constant, which is empirically obtained. If the idle interval is longer than the 'wait interval', then in operation 609, inactive time interval $\Delta t_i$ is incremented by adding the recorded idle interval. In this case, inactive time interval $\Delta t_i$ includes the idle time during which the monitored application was in the foreground (e.g. the active application), whereas in operation 606, inactive time interval $\Delta t_i$ includes the background interval during which the monitored application was in the background, and the active application was not the monitored one. If the recorded idle interval is shorter than the 'wait interval', then the process of calculating the inactive time interval, that accumulates both background interval and idle interval, ends in operation 610.

Reference is now made to FIG. 7, which is a flowchart of operations 700 performed by a screen connectivity monitoring application, as part of an enforcement mode, according to exemplary embodiments of the disclosed subject matter. It is noted that the enforcement mode may be activated after a learning mode and/or in parallel to a learning mode.

During the enforcement mode, the specific monitored application that is running on the user's computerized device is continuously monitored by screen connectivity monitoring application and data related to times of events occurrence, per each user interface element, is compared to the data collected during the learning mode. The comparison enables determining whether there is a possible connectivity malfunction in the monitored application running on the user's computerized device, and further determining which user interface element caused the possible malfunction.

In operation 701, screen connectivity monitoring application may determine a monitoring interval based on the corresponding elapsed interval as calculated during the learning mode, per each user interface element. The monitoring interval is the time interval during which, or after which a user interface element is repetitively being monitored by the screen connectivity monitoring application. Some user interface elements may have a short monitoring interval, e.g., the user interface element may be monitored every few seconds or even milliseconds, whereas other user interface elements may have a longer monitoring interval, e.g., the element may be monitored every few minutes, or even hours. The length of the monitoring interval is determined based on typical elapsed interval or time during which the monitoring application determines that a user is interacting with each element.

In operation 710, a warning threshold per user interface element based on elapsed interval statistics corresponding to the user interface element, may be obtained. An elapsed interval calculated for a user interface element may later be compared to the warning threshold (and exception threshold) in order to determine presence of connectivity malfunction.

In operation 702, the screen connectivity monitoring application may monitor "create" events per each user interface element, and its associated object. The definition of "create" event and "destroy" event in the enforcement mode are similar to their definitions in the learning mode. In operation 703, screen connectivity monitoring application may calculate an elapsed interval for each user interface element.

Calculations of elapsed interval values during enforcement mode may be done similarly to calculations of elapsed interval during the learning mode, e.g., the time between creation events obtained for a user interface element, to creation events of an associated object, during a session of a monitored application. Elapsed time may be calculated by subtracting time of creation of an object from time of creation of a user interface element (while also eliminating inactive time intervals, e.g. idle time and time spent on applications other than the monitored one), as explained herein with respect to FIG. 2.

In operation 704, screen connectivity monitoring application may compare the currently calculated elapsed interval for each user interface element, to its respective predetermined warning (and/or exception) threshold obtained in operation 710. The warning threshold may be based on statistical calculations performed during the learning mode, e.g., the mean and/or standard deviation of an elapsed interval of the corresponding user interface element that was calculated during the learning mode.

In operation 705, the screen connectivity monitoring application may determine whether or not the currently calculated elapsed interval is longer than the predetermined threshold. If the elapsed interval is shorter than the warning threshold, screen connectivity monitoring application may continue to monitor "create" events (and "destroy" events) in operation 702, and so on, as described above. However, if the elapsed interval is longer than the warning threshold, then in operation 707, screen connectivity monitoring application may generate a warning alert regarding a possible malfunction in screen connectivity per the specific user interface element for which comparison between the elapsed interval and the warning threshold were conducted. In some embodiments, the device warning alert may be displayed to the user or an administrator of the monitored application. The user may then refer to the warning alert and thus know which element should be amended in order to overcome the connectivity malfunction. In some embodiments, an exception alert may also be generated, if the elapsed interval exceeds a different, e.g. stricter or harsher exception threshold, which may also be obtained per user interface element based on elapsed interval statistics corresponding to the user interface element.

In some embodiments, in operation 707 screen connectivity monitoring application may generate, in real time or substantially in real time, an alert to the user regarding the presence of connectivity malfunctions, while identifying the user interface element that caused the connectivity malfunction, based on the comparison to the warning/exception threshold. In some embodiments, the alert causes the application to display on the user's computerized device an indication or message or other alert regarding a detected connectivity malfunction, which includes an identifier of which user interface element caused the malfunction. The alert may be displayed on a display unit, which may be part of the user's computerized device, or may be sent to a remote station or computerized device, e.g. to a mobile device or to a remote workstation. In some embodiments, the alert may be displayed on a display unit, which may be part of an administrator's device. The alert may be displayed in a visual and/or auditory manner.

Reference is now made to FIG. 8, which is a schematic flowchart of operations of a method for creating device warning and exception alerts, according to exemplary embodiments of the disclosed subject matter. According to some embodiments, the screen connectivity monitoring application is configured to alert the user or an administrator on connectivity malfunctions, as well as provide information with regards to the specific user interface element that was changed and thus caused the connectivity break or malfunction. A device warning alert may be generated by the screen connectivity monitoring application when the elapsed interval calculated during the enforcement mode, exceeds a predetermined warning threshold, which is obtained per user interface element based on elapsed interval statistics corresponding to the user interface element. For example, the warning threshold may conform to the "three-sigma rule", such that if elapsed interval exceeds the "three-sigma rule", i.e., that the elapsed interval is longer than the average time plus three times the standard deviation, a device warning alert may be generated by the screen connectivity monitoring application.

In some embodiments, the screen connectivity monitoring application may trigger or generate a device exception alert if the elapsed interval exceeds a stricter predetermined threshold, thus indicating that there might be some error with the monitored application or with time related findings, or with the processing performed by the screen connectivity monitoring application. The exception threshold, as is the warning threshold, may be obtained per user interface element based on elapsed interval statistics corresponding to the user interface element. For example, the exception threshold may be the maximum observation value plus three times the standard deviation. If the elapsed interval exceeds the maximum observation value ($X_{max}$) plus three times the standard deviation, then screen connectivity monitoring application may generate an exception or error alert, along with identification of the user interface element that caused such an error or exceptional time related calculations.

According to some embodiments, diagram 800 may comprise a start point 801 in which a timer is set and begins to count time in order to determine the monitoring interval during which or after which a specific user interface element is being monitored. In operation 802, the elapsed interval (X) per a specific user interface element may be calculated. In operation 804, a determination should be made as to whether or not the elapsed interval exceeds a first predetermined condition, e.g., the warning threshold. For example, the warning threshold may be a threshold conforming to the "three-sigma rule". In other embodiments, elapsed interval may be compared to any other threshold.

A device warning alert may be generated in operation 805 if in operation 804 the elapsed interval (X) exceeds the warning threshold. If the condition in operation 804 is met, then in operation 805 a warning alert regarding a connectivity malfunction may be generated. The device warning alert may be displayed to the user or an administrator by visual and/or auditory manner. However, if the elapsed interval is shorter than the warning threshold, screen connectivity monitoring application continues to monitor user interface elements according to their respective monitoring interval, as in operation 801.

In operation 807 the elapsed interval (X) is compared to a second predetermined condition, e.g., the exception threshold, and determination is required as to whether or not the elapsed interval exceeds the second predetermined condition, e.g., the exception threshold, which is stricter than the warning threshold. In one example, the exception threshold may be the maximum observation value plus three-times sigma, though other exception thresholds may be implemented. In case the elapsed interval (X) exceeds the exception threshold, e.g., if the elapsed interval exceeds the maximum observation value ($X_{max}$) plus three times sigma, then an exception alert may be generated in operation 808. The device exception alert may further be displayed to the user or an administrator in a visual and/or auditory manner. However, if the exception condition regarding the elapsed interval isn't met, and the elapsed interval is shorter than the predetermined exception threshold (e.g., maximum observation value ($X_{max}$) plus three times sigma) then no alert may be generated.

Reference is now made to FIG. 9, which is a schematic flowchart of operations of a method for creating system warning alerts, according to exemplary embodiments of the in disclosed subject matter. Method 900 may comprise operation 901, which may comprise receiving device warning and/or exception alerts with regards to an identified user interface element from a monitoring application installed on a user device. That is, in operation 901, alerts per an identified user interface element that may be liable for connectivity malfunction in a user's device, may be received. According to some embodiments, such alerts may be received by Enterprise Statistical Calculator 109, in FIG. 1. In some embodiments, in operation 902, the monitoring application installed in other users' devices may be used to monitor the identified user interface element, in other users' devices. This may be done in order to determine whether the user interface element may have not only caused a local connectivity malfunction in one user's device but may have rather caused a systemic connectivity malfunction in other or all users' devices. In operation 903, the elapsed interval (X) may be calculated for the identified user interface element per each user. These calculations may be executed by Enterprise Statistical Calculator 109.

In operation 904, determination is required as to whether or not the elapsed interval calculated for the identified user interface element, per each user, meets the first predetermined condition. The first predetermined condition may be the same as the first predetermined condition disclosed with respect to operation 1004, in FIG. 8, e.g., the elapsed interval should exceed the mean plus three-times sigma. If the elapsed interval does not meet the first condition, then receiving other device warning and/or exception alerts carries on, as in operation 901. However, if the elapsed interval does meet the first condition, then in operation 905, a determination is required as to whether or not the number of user devices in which the elapsed interval of the identified interface element meets the first predetermined condition, meets an enterprise predetermined condition. If the elapsed interval meets the first predetermined condition for more than one user, it may be inferred that the identified user interface element is liable for a connectivity malfunction, not only locally per one user's device but rather systemically per other or all users' devices. The enterprise predetermined condition may, for example, conform to the "three-sigma rule", while statistical calculations performed in order to calculate the relevant statistical parameters, e.g., mean and sigma, which are relevant to all users, may be done per user interface element per the total observations of all the users.

If the number of user devices in which the elapsed interval of the identified interface element meets the first predetermined condition, meets an enterprise predetermined condition, then in operation 906, a system warning alert may be generated. The system alert may be displayed to the users or to an administrator who may infer that the connectivity malfunction is systemic and not merely local. In case the number of user devices in which the elapsed interval of the identified interface element meets the first predetermined condition, does not meet the enterprise predetermined condition, then receiving other device warning and/or exception alerts carries on, as in operation 901.

There is thus provided according to the present disclosure a system for detecting and monitoring screen connectivity malfunctions. The system may comprise a processing unit configured to determine user interface elements to be monitored, monitor the determined user interface elements to obtain time of creation (and destruction) events of each user interface element and its associated object, and calculate an elapsed interval for each user interface element. The processing unit may be further configured to calculate statistical parameters for each user interface element based on the elapsed interval, determine a monitoring interval to sample creation and destruction events associated with each user interface element, and monitor the determined user interface elements, to obtain time of creation and/or destruction events.

In some embodiments, the processing unit may be further configured to calculate an elapsed interval for each user interface element, based on the monitored creation and/or destruction events, compare the elapsed interval to a corresponding warning threshold to determine presence of connectivity malfunctions, wherein the corresponding warning threshold is based on said statistical parameters associated with each user interface element. And finally, the processing unit is configured to generate, in real time, an alert to the user regarding the presence of connectivity malfunctions. The alert may comprise an identification of the user interface element that caused the connectivity malfunction. The system may further comprise a display unit to provide the alert to the user in an auditory or visual manner.

In some embodiments, the processing unit may further be configured to compare the elapsed interval to a corresponding exception threshold in order to determine errors in processing.

In some embodiments, the processing unit may further be configured to compare the elapsed interval to corresponding warning thresholds obtained from all users of the same monitored application. In some embodiments, the processing unit may be configured to generate, in real-time, an alert to all users of the monitored application regarding presence of a systemic connectivity malfunction.

There is thus further provided, according to the present disclosure, a method for detecting and monitoring screen connectivity malfunctions. According to embodiments of the present invention, the method comprises the steps of:

(a) providing a "screen connectivity" application to a user for installation on a user's computerized device, wherein the "screen connectivity" application may access user interface elements through GUI of a specific application;

(b) determining user interface elements to be monitored by the "screen connectivity" application;

(c) monitoring the determined user interface elements to obtain time of creation (and destruction) events of each user interface element;

(d) calculating an elapsed interval for each user interface element;

(e) based on the elapsed interval, calculating statistical parameters for each user interface element;

(f) determining a monitoring interval to sample creation and destruction events associated with each user interface element;

(g) monitoring the determined user interface elements, to obtain time of creation (and/or destruction) events;

(h) calculating an elapsed interval for each user interface element, based on the monitored creation and/or destruction events;

(i) comparing the elapsed interval to a corresponding warning threshold to determine presence of connectivity malfunctions, said corresponding warning threshold based on said statistical parameters associated with each user interface element; and (j) generating, in real time, an alert to the user regarding the presence of connectivity malfunctions, said alert comprising an identification of the user interface element that caused the connectivity malfunction.

According to some embodiments, the alert may cause the application to display on the user's computerized device an alert regarding connectivity malfunctions, which further comprises an identification of the user interface element that caused the connectivity malfunction.

In some embodiments, the method may further comprise the step of comparing the elapsed interval to a corresponding exception threshold to determine errors in processing.

In some embodiments, the method may further comprise the step of comparing the elapsed interval to corresponding warning thresholds obtained from all users of the same monitored application. In some embodiments, the method may further comprise the step of generating, in real-time, an alert to all users of the monitored application regarding presence of a systemic connectivity malfunction.

In the context of some embodiments of the present disclosure, by way of example and without limiting, terms such as 'operating' imply also capabilities, such as 'operable'.

The terms 'processor' or 'processing unit' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor', 'processing unit' or 'computer' or derivatives thereof denote an apparatus that is capable of carrying out a provided or an incorporated program and/or is capable of controlling and/or accessing data storage apparatus and/or other apparatus such as input and output ports. The terms 'processor', 'processing unit' or 'computer' denote also a plurality of processors or computers connected, and/or linked and/or otherwise communicating, possibly sharing one or more other resources such as a memory.

The processor/processing unit and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

As used herein, the term 'server' denotes a computerized apparatus providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

As used herein the term "configuring" and/or 'adapting' for an objective, or a variation thereof, implies using materials and/or components in a manner designed for and/or implemented and/or operable or operative to achieve the objective.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

Terms in the claims that follow should be interpreted, without limiting, as characterized or described in the specification.

The invention claimed is:

1. A system for detecting screen connectivity monitoring application malfunctions in a multiple-user environment as a result of modifications to user interface elements, the system comprising:
   a processing unit configured to:
      (A) operate baseline learning phase per each user in the multiple-user environment:
         (i) determine elements of a user interface of an application to be monitored based on a recorded flow of operations, for a first user,
            wherein the recorded flow of operations includes user interface elements that are related to or associated with one another;
         (ii) monitor the determined user interface elements to obtain time of creation events of each user interface element;
         (iii) calculate an elapsed interval for each user interface element, based on the monitored creation events;
         (iv) calculate statistical parameters for each user interface element, based on the elapsed interval; and
         (v) determine a monitoring interval to sample creation events associated with each user interface element;
         wherein said operated baseline learning phase is configured to collect and analyze statistical data related to the creation and destruction of said determined user interface elements to generate a baseline functionality of said user interface, for the first user,
      (B) operate enforcement phase per each user in the multiple-user environment: repeat steps (ii) through (iii) and for each calculated elapsed interval perform the following steps:
         (a) compare the elapsed interval to a corresponding warning threshold for the first user, wherein said corresponding warning threshold for the first user is based on said statistical parameters associated with each user interface element;
         when the elapsed interval for the first user is longer than said corresponding warning threshold for the first user, perform the following steps:
         (b) determine presence of one or more screen connectivity monitoring application malfunctions in the multiple-user environment based on the comparison for the first user, and
         (c) generate, in real time, an alert regarding the presence of said one or more screen connectivity monitoring application malfunctions in the multiple-user environment as a result of modifications to one or more user interface elements for the first user, said alert comprising an identification of the one or more user interface elements that caused the one or more screen connectivity monitoring application malfunctions, such to resolve said one or more screen connectivity monitoring application malfunctions; and a display unit to provide the alert in an auditory or visual manner, wherein said enforcement phase is configured to recognize modifications of user interface elements of the monitored application, per each user, which represent connectivity malfunctions of the monitoring application and wherein the modifications are relative to said generated baseline functionality, per each user.

2. The system according to claim 1, wherein the processing unit is further configured to compare the elapsed interval to a corresponding exception threshold to determine errors in processing.

3. The system according to claim 1, wherein the processing unit is further configured to compare the elapsed interval obtained from all users of the same monitored application to corresponding warning thresholds.

4. The system according to claim 3, wherein the processing unit is configured to generate, in real-time, an alert to all users of the monitored application regarding presence of a systemic screen connectivity malfunction.

5. The system according to claim 1, wherein the processing unit is configured to determine idle interval as a time where the monitored application is inactive and to calculate an elapsed interval by subtracting idle intervals from the time of creation and time of destruction of each user interface element.

6. The system according to claim 1, wherein the processing unit is configured to determine background interval as a time where a user is working on other applications but the monitored application and calculate an elapsed interval by subtracting background intervals from the time of creation and time of destruction of each user interface element.

7. A method for detecting screen connectivity monitoring application malfunctions in a multiple-user environment as a result of modifications to user interface elements, the method comprising the steps of:

activating a "screen connectivity" application on a user's computerized device per each user, the "screen connectivity" application operating the following phases:

(A) baseline learning phase per each user in the multiple-user environment the baseline learning phase comprises the following steps:

(a) accessing elements of a user interface through a Graphical User Interface (GUI) of a monitored application;

(b) determining user interface elements of said monitored application to be monitored by the "screen connectivity" application based on recorded flow of operations, for a first user, wherein the recorded flow of operations includes user interface elements that are related to or associated with one another;

(c) monitoring the determined user interface elements to obtain time of creation and destruction events of each user interface element;

(d) calculating an elapsed interval for each user interface element based on the monitored creation events;

(e) calculating statistical parameters for each user interface element, based on the elapsed interval;

(f) determining a monitoring interval to sample creation events associated with each user interface element;

wherein said baseline learning phase is configured to collect and analyze statistical data related to the creation and destruction of user interface elements, and to generate a baseline functionality of said user interface, for the first user, (B) enforcement phase per each user in the multiple-user environment, the enforcement phase comprises the following steps:

(g) repeating steps (c) through (d) and for each elapsed interval:

(i) comparing the elapsed interval to a corresponding warning threshold for the first user, wherein said corresponding warning threshold for the first user is based on said statistical parameters associated with each user interface element;

when the elapsed interval is longer than said corresponding warning threshold performing the following steps:

(ii) determining presence of one or more screen connectivity monitoring application malfunctions in the multiple-user environment based on said comparison, fr the first user, (iii) generating, in real time, an alert to the user regarding the presence of said one or more screen connectivity monitoring application malfunctions in the multiple-user environment as a result of modifications to one or more user interface elements for the first user, said alert comprising an identification of the one or more user interface elements that caused the one or more screen connectivity monitoring application malfunctions, such to resolve said one or more screen connectivity monitoring application malfunctions; and (iv) displaying on the user's computerized device, an alert regarding said one or more screen connectivity monitoring application malfunctions, which further comprises an identification of the one or more user interface elements that caused the one or more screen connectivity monitoring application malfunctions, wherein said enforcement phase is configured to recognize modifications of user interface elements of the monitored application, per each user, which represent connectivity malfunctions of the monitoring application and wherein the modifications are relative to said generated baseline functionality, per each user.

8. The method according to claim 7, the method further comprising the step of comparing the elapsed interval to a corresponding exception threshold to determine errors in processing.

9. The method according to claim 7, the method further comprising the step of comparing the elapsed interval obtained from all users of the same monitored application to corresponding warning thresholds.

10. The method according to claim 9, wherein the method further comprises the step of generating, in real-time, an alert to all users of the monitored application regarding presence of a systemic screen connectivity malfunction.

* * * * *